Figure 1:
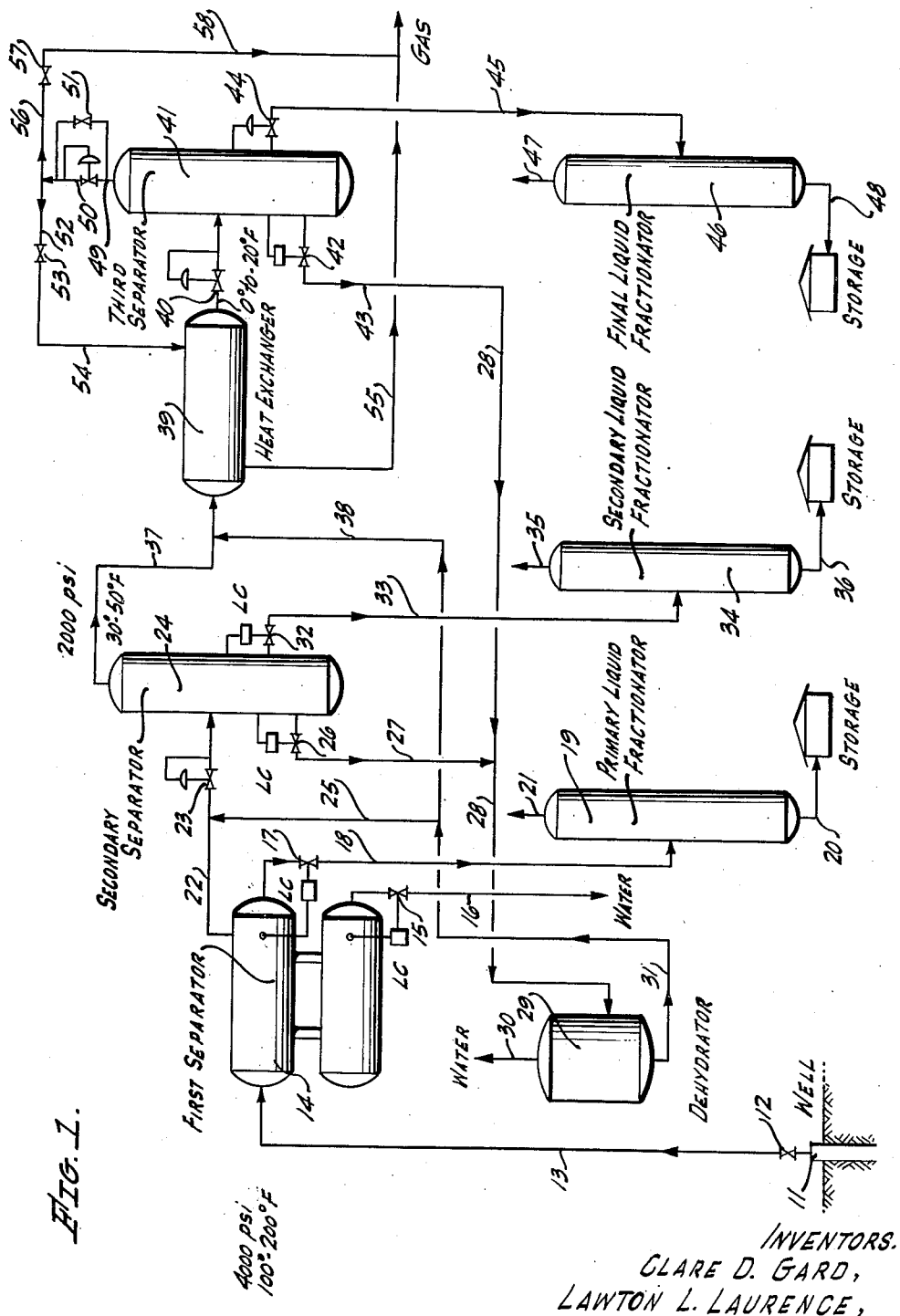

Nov. 11, 1952

C. D. GARD ET AL 2,617,276

SEPARATION OF HYDROCARBONS

Filed June 23, 1950

2 SHEETS—SHEET 1

INVENTORS.
CLARE D. GARD,
LAWTON L. LAURENCE,
BY Richard C. Hactuin
ATTORNEY.

Nov. 11, 1952  C. D. GARD ET AL  2,617,276
SEPARATION OF HYDROCARBONS
Filed June 23, 1950    2 SHEETS—SHEET 2
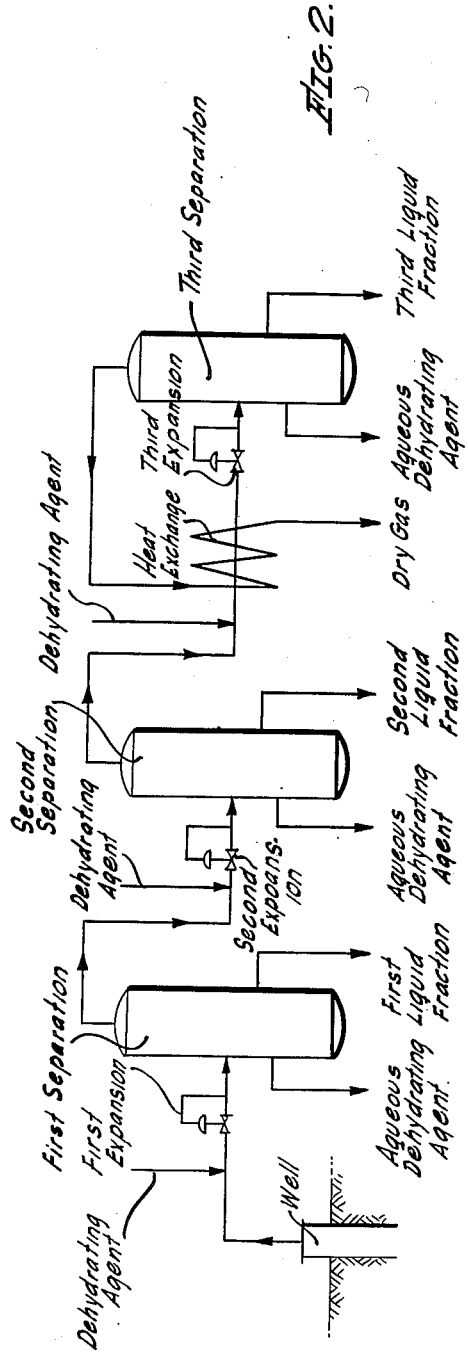
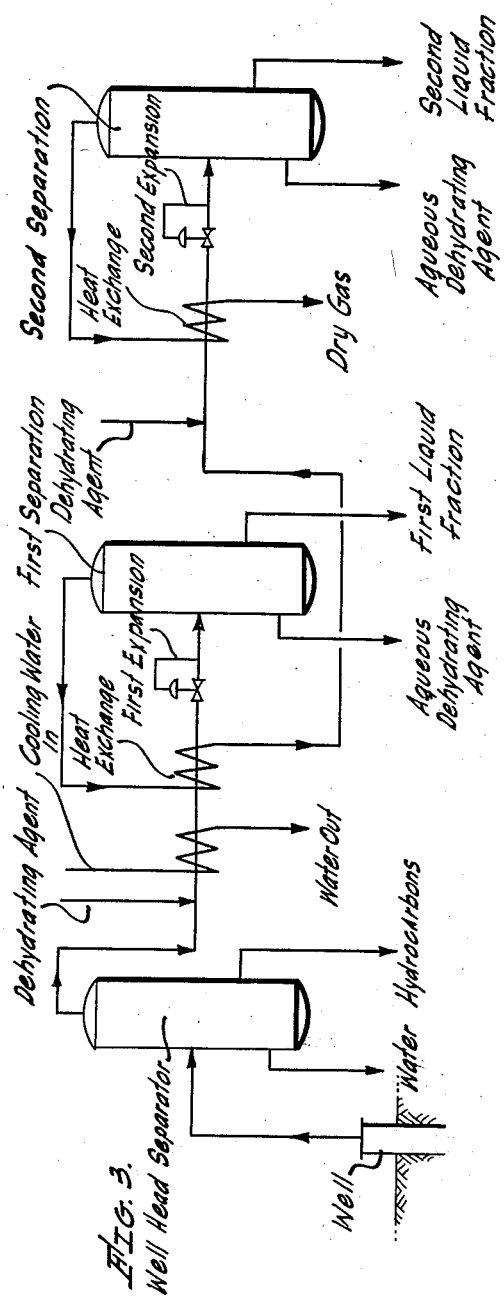
INVENTORS:
CLARE D. GARD,
LAWTON L. LAURENCE,
BY Richard C. Hartman
ATTORNEY.

Patented Nov. 11, 1952

2,617,276

UNITED STATES PATENT OFFICE 2,617,276

SEPARATION OF HYDROCARBONS

Clare D. Gard, Pasadena, Calif., and Lawton L. Laurence, Kansas City, Mo., assignors of one-half to Union Oil Company of California, Los Angeles, Calif., a corporation of California, and one-half to Black, Sivalls and Bryson, Inc., Kansas City, Mo., a corporation of Delaware Application June 23, 1950, Serial No. 170,004

11 Claims. (Cl. 62—175.5)

This invention relates to the separation of low molecular weight hydrocarbons, and in particular concerns an improved process for separating the liquefiable constituents from the hydrocarbon fluids obtained from wells of the distillate type.

Within recent years the production of natural gas and gasoline from so-called "distillate" or "condensate" reservoirs has become of increasing commercial importance. Within the producing formation of such reservoirs there exists a substantially homogeneous gaseous mixture of relatively low molecular weight hydrocarbons under pressures as high as 3000 pounds per square inch or even higher and at temperatures of 80°–150° F. or higher. In almost all instances such conditions of temperature and pressure are near the dew point curve of the two-phase boundary for the mixture as plotted on pressure-temperature coordinates, and accordingly any substantial reduction in pressure within a limited range will cause condensation of a liquid phase. This phenomenon is referred to as "retrograde condensation." The range of pressures over which retrograde condensation occurs is known as the "retrograde condensation range," and depends upon the composition of the hydrocarbon mixture and the prevailing temperature. In most instances it extends from about 4000 pounds per square inch down to about 1000 pounds per square inch at ordinary bottom hole temperatures. At pressures above the retrograde condensation range the mixture exists as a gaseous fluid but as the pressure on the fluid is reduced to values within this range retrograde condensation occurs with the formation of a liquid phase. As the pressure is further reduced to values below the retrograde condensation range no further condensation of liquid occurs, but instead the liquid phase will re-dissolve in the gas phase and the mixture will again take the form of a homogeneous gaseous fluid.

As previously stated, the hydrocarbon mixture within the producing formation usually exists substantially entirely as a gaseous fluid at pressures above or near the upper limit of the retrograde condensation range. In some wells sufficient of a pressure and temperature drop exists along the length of the well bore that the pressure at the well head is within the retrograde condensation range, so that retrograde condensation occurs within the well bore and the product taken from the well is a mixed fluid comprising a gas phase having entrained therein droplets of a liquid phase comprised of normally liquid hydrocarbons containing dissolved light gases. A second liquid phase comprising water may also be present. In other instances the pressure drop along the well bore is of relatively small magnitude, and the pressure at the well head is only slightly below the upper limit of the retrograde condensation range and may even be above this range. In certain producing fields well head pressures and temperatures of 4000 pounds per square inch and 120° F. are not uncommon.

In the production of natural gas for use as commercial fuel from distillate wells wherein a hydrocarbon mixture is obtained at the well head under high pressure within or above the retrograde condensation range, it is desirable that the liquefiable components of the mixture be separated from the normally gaseous components, and that the latter be delivered to the pipeline transportation system at a relatively low pressure of 1000 pounds per square inch or less. According to one mode of operation, the pressure is reduced to about 1200 pounds per square inch or less and the liquefiable components are separated from the light gases by selective absorption in a hydrocarbon oil. Such procedure is well adapted to large-scale operations involving the processing of very large volumes of gas, but the high capital investment required makes it economically unsatisfactory for small or moderate size installations. Another method of processing natural gas from high pressure distillate wells takes advantage of the retrograde condensation phenomenon, and involves expanding the gas to approximately the lower limit of the retrograde condensation range, separating from the residual gases the liquid hydrocarbons which are thereby condensed, and finally expanding the residual gas to the desired pipeline transportation pressure. Such mode of operation is satisfactory for small or moderate scale operations from the standpoint of being more economical than the absorption process, but it is not entirely satisfactory from the standpoint of recovering the highest possible amount of liquefiable hydrocarbons from the gas. Also, the condensed hydrocarbons are separated as a single liquid mixture which must be fractionated in relatively expensive and complicated fractionation equipment if it is desired to recover the individual components of the mixture.

It is accordingly an object of the present invention to provide an improved method for separating the liquefiable components from the mixed hydrocarbon effluent from high pressure wells.

Another object is to provide an improved procedure whereby the pressure of the effluent from high pressure wells may be reduced to values suitable for pipeline transportation of the residual gaseous components of said effluent with simultaneous separation of the liquefiable components of said effluent.

A further object is to provide an economical and efficient method for processing high pressure natural gas for use in the various arts.

Other objects will be apparent from the following detailed description of the invention, and various advantages not specifically referred to herein will occur to those skilled in the art upon employment of the invention in practice.

We have now found that the above and related objects may be realized in a process whereby the pressure of the well effluent is reduced through the retrograde condensation range in two or more distinct steps, each of which steps is succeeded by a gas-liquid separation step, and at least the last of which pressure-reducing steps is preceded by a refrigeration step in which at least part of the refrigeration is supplied by the cold gas obtained from the next succeeding separation step. More particularly, we have found that the objects of the invention may be realized by taking the gas as it is obtained at the well head under a pressure within or above the retrograde condensation range and, after separating any entrained liquid hydrocarbons and/or water, expanding it to a pressure within the retrograde condensation range, separating from the expanded gas the liquid which is thereby condensed, and further expanding the gas to approximately the lower limit of the retrograde condensation range in one or more steps, each of which is followed by a liquid separation step and at least the last of which expansion steps is preceded by a refrigeration step whereby the gas is cooled by indirect heat exchange against the cold gas which is separated in the following separation step. Such mode of operation is highly efficient and effects the recovery of a maximum amount of the liquefiable hydrocarbon components of the gas. Furthermore, such components are obtained as a series of liquid fractions corresponding in number to the number of expansion and separation stages, and may be employed directly as such for various purposes or may be further fractionated to obtain the individual components or specific mixtures thereof in very simple and inexpensive apparatus.

The nature of the invention may be readily understood by reference to the accompanying drawings which form a part of this specification. Figure 1 of said drawings is a schematic diagram in the form of a flow sheet illustrating a preferred method of applying the principle of the invention. Figures 2 and 3 diagrammatically illustrate alternative modes of procedure.

Referring now to Figure 1, the well effluent is withdrawn from well head 11 and is passed through cut-off valve 12 and line 13 to separator 14, shown as being of the horizontal type. Within separator 14, which is maintained at the well head pressure, e. g., 4000 p. s. i., any liquid water which may have been present in the well effluent separates as a lower liquid layer and is drawn off and discarded through level-controlled valve 15 and line 16. Any liquid hydrocarbon which may be contained in the effluent as a result of retrograde condensation occurring within the well bore as previously explained separates within separator 14 as an upper liquid layer, and is withdrawn through level-controlled valve 17 and line 18, and is passed to primary liquid fractionator 19. The latter may be of any type suitable for the fractionation of light hydrocarbons in the conventional manner and is shown as producing a bottoms fraction which is passed to storage through line 20 and an overhead fraction which is taken off through line 21. The latter fraction will usually consist mostly of nonliquefiable gases, e. g., methane, contained in solution in the liquid hydrocarbon phase withdrawn from separator 14, and may be passed to the final product gas stream if desired.

The residual gas withdrawn from separator 14 is passed through line 22 and expansion valve 23 to a second separator 24. Prior to its passage through the expansion valve, a dehydrating agent or hydrate inhibitor such as diethylene glycol, methanol, or calcium chloride brine is introduced into the gas stream through lines 25 and 31. Expansion valve 23 is set to expand the gas to a pressure within the retrograde condensation range, e. g., to 2000 p. s. i. and as a result of such expansion the temperature of the gas is lowered, e. g., to 30°–50° F., and part of the liquefiable hydrocarbons are condensed by retrograde condensation. Within separator 24 a mixture of the dehydration agent or hydrate inhibitor and water separates as a lower liquid layer which is withdrawn through level-controlled valve 26 and line 27 and is passed through line 28 to dehydrator 29. The latter may take the form of a simple pot still or the like wherein water is removed from the aqueous dehydration agent or hydrate inhibitor, such water being withdrawn and discarded through line 30, and the dehydration agent or hydrate inhibitor being returned to the system through line 31. Also within separator 24, the hydrocarbons which have been condensed as a result of expanding the gas partially through the retrograde condensation range separate as an upper liquid layer which is withdrawn through level-controlled valve 32 and line 33, and is passed to a secondary liquid fractionator 34. Within the latter the liquid hydrocarbon mixture is fractionated as desired in the conventional manner to obtain an overhead fraction taken off through line 35 and a bottoms fraction which is passed to storage through line 36.

The residual gas within separator 24 at a pressure within the retrograde condensation range is withdrawn through line 37 and is mixed with a further quantity of the dehydration agent or hydrate inhibitor introduced through lines 31 and 38, and is passed through heat exchanger 39 and expansion valve 40 into a third separator 41. Within heat exchanger 39 the gas is cooled, e. g., to a temperature of 0° to −20° F., by indirect heat exchange against the cold gas withdrawn from separator 41. Expansion valve 40 is set to expand the gas to approximately the lower limit of the retrograde condensation range, e. g., to 1000 p. s. i., and as a result of said expansion the gas is further cooled, e. g., to a temperature of −10° to −30° F., and condensation of a further quantity of hydrocarbons occurs. Within separator 41 a mixture of the dehydrating agent or hydrate inhibitor and water separates as a lower liquid layer which is withdrawn through level-controlled valve 42 and line 43 and is passed to the dehydrator 29 through line 28. The condensed hydrocarbons within separator 41 separate as an upper liquid layer which is withdrawn through level-controlled valve 44 and line 45 and is passed to a final liquid fractionator 46. The latter is shown producing an overhead fraction which is withdrawn through line 47, and a bottoms fraction which is passed to storage through line 48.

The residual gas which is substantially free of liquefiable constituents as a result of having been expanded through the retrograde condensation range is withdrawn from separator 41 through line 49. If it is desired to supply such gas to pipeline transportation or otherwise employ it at a lower pressure, it may be passed through expansion valve 50 which is set to maintain the desired low pressure. On the other hand, if it is desired to produce the gas at the separator pressure, i. e., at a pressure approximately equal to the lower limit of the retrograde condensate range, expansion valve 50 may be closed and the gas stream by-passed around expansion valve 50 through valve 51. The gas is then passed through line 52, valve 53 and line 54 to heat-exchanger 39, wherein it serves to cool the incoming gas supplied to the expansion valve 40 and separator 41, and finally is passed to storage or pipeline transportation through line 55. Line 56, valve 57 and line 58 are provided for use in case it is desired to employ only part of the cold gas for refrigeration purposes. By suitably adjusting valves 53 and 57 a part of the cold gas may be by-passed around heat-exchanger 39 and passed directly to storage or pipeline transportation through line 58.

It will be noted that in the process described above in connection with the drawing, the high pressure gas taken from the well is expanded through the retrograde condensation range in two steps, each of which is followed by a gas-liquid separation step, and that the final expansion step is preceded by a refrigeration step whereby the gas is cooled by indirect heat exchange against the expanded gas withdrawn from the final separation step. Such a two-stage process embodies the principle of the invention in its simplest form, and is usually satisfactory for the treatment of most well effluents. If desired, however, any number of expansion and accompanying separation steps may be provided in expanding the gas through the retrograde condensation range, the number of such stages and the physical conditions at which they are effected being dictated by economic and technical considerations. Thus, for example, where the well effluent comprises a relatively high proportion of liquefiable hydrocarbon components and it is desired to recover these components in the form of a series of fractions of relatively narrow boiling range, the well effluent may be expanded through the retrograde condensation range in three or four or even five separate steps each of which is followed by a gas-liquid separation step. By employing a multiplicity of such stages in this manner, subsequent fractionation of the liquid product withdrawn from the separator in each stage is greatly simplified, and in some instances may be dispensed with entirely or reduced to a simple stripping or flash distillation operation. The process of the invention thus provides a method for separating the liquefiable hydrocarbon components of high pressure well effluents into a number of fractions of desired boiling range partially or entirely by fractional condensation within the retrograde condensation range. It will be seen that such procedure is different in principle from that employed in recycling operations wherein the liquid condensate obtained by a single expansion of the gas to approximately the lower limit of the retrograde condensation range is fractionated by a series of flash vaporizations carried out at successively lower pressures.

As will be apparent to those skilled in the art, numerous modifications and alternative procedures are possible within the scope of the invention. For example, in the process illustrated by the accompanying drawing and explained in detail above, there is provided a first separator which serves to separate any liquid water and/or hydrocarbons which may be contained in the well effluent as a result of retrograde condensation occurring along the length of the well bore. In some producing fields, however, the well effluent taken from the well head is at a pressure above or near the upper limit of the retrograde condensation range, and hence does not contain any substantial quantity of liquid. In such instances the first separator may be dispensed with, and the well effluent may be passed directly to the first expansion-separation stage. Similarly, in the two-stage process previously described, refrigeration of the gas is effected at a point just prior to the final expansion step. If desired, however, the gas may also be cooled at other points along its line of flow, e. g., just prior to the first expansion step or even immediately following its withdrawal from the well head. Also, various refrigerating media may be employed, e. g., the gas from a subsequent point in the process, the condensed liquid taken from a subsequent separator, the dehydrating agent or hydrate inhibitor, cold water, etc. Figures 2 and 3 of the accompanying drawing illustrate two of the possible alternative modes of applying the principle of the invention.

Figure 2 illustrates a three-stage process with the well effluent being introduced directly into the first stage without preliminary separation of entrained liquids, and with a single refrigeration step preceding the final expansion-separation stage. Fresh dehydrating agent or hydrate inhibitor is introduced into the gas stream ahead of each expansion step.

Figure 3 illustrates a two-stage process with preliminary separation of entrained water and liquid hydrocarbons, and with three refrigeration steps. Prior to the first expansion step the gas is cooled with water, and then by indirect exchange against the gas withdrawn from the first separation step. Prior to the second expansion step, the partially expanded gas is further cooled by indirect heat exchange against the gas withdrawn from the second separation step.

Other arrangements within the scope of the invention may be devised to adapt the process to use under particular operating conditions in the treatment of particular well effluents to produce liquid hydrocarbon fractions and dry gas of specific compositions.

As previously mentioned, the number of expansion-separation stages and the conditions of pressure and temperature under which they are effected may be varied so as to obtain directly a series of liquid condensate fractions of desired boiling range. Usually, however, it is preferable to obtain fractions of specific boiling range by subjecting the liquid product withdrawn from each separation step to fractional distillation. Since an approximate fractionation to the desired boiling range may be effected by suitably selecting the pressure and temperature at which each of the expansion-separation stages is carried out, the subsequent fractional distillation of the product will be a very simple operation. Accordingly, the liquid fractionators referred to in the preceding description of the invention may be of very simple design and construction, and may even take the form of simple stripping columns. Also, while the fractionators are shown and described as operating independently of one another, some or all of them may be operated cooperatively so as to produce maximum quantities of liquid hydrocarbon mixtures of predetermined composition and boiling range. Thus, the overhead product from one of the fractionators may be introduced as part of the feed of a preceding fractionator, or a bottoms product may be introduced as part of the feed of a succeeding fractionator, to secure highest efficiency in separating the liquid hydrocarbons into fractions having desired physical properties. In some instances, it may be desirable to return a portion of one of the liquid hydrocarbon fractions to the gas stream just prior to the refrigeration step.

The use of a dehydrating agent or hydrocarbon hydrate inhibitor in retrograde condensation operations is well known in the art, and may be applied to the process of the present invention in any of the usual ways. Any of the customary dehydrating agent or hydrate inhibitors may be so employed, and it is preferred that such agent or inhibitor be introduced into the gas stream just prior to each of the two or more expansion steps. The aqueous agent or inhibitor withdrawn from each of the separators may be dehydrated or concentrated and rendered fit for re-use in the process by simple or fractional distillation, evaporation, or other suitable procedure.

One of the features of the present process which renders it particularly well suited to small or moderate-scale operations lies in the fact that it does not require expensive or complicated apparatus or equipment. The separators need be little more than simple knock-out drums constructed to withstand the operating pressure. If desired, they may be fitted with internal baffles to promote efficient mechanical separation of the condensed liquid from the gas. Similarly, the one or more heat exchangers may be of conventional design such as the common tube-and-shell arrangement. As previously explained, there will usually be provided a first separator on the upstream side of the first expansion step for the purpose of separating any liquids entrained in the well effluent. Such separator may likewise be of the conventional type and, if desired, may be located at or near the well head. In locations where a number of producing wells are serviced by a common centrally located gas treating plant, each well head may be equipped with a separator, and the gas and liquid effluents from such separators my each be piped to the common plant for treatment according to the process of the invention.

The particular manner in which the process is carried out, particularly the number of expansion-separation stages employed and the pressure and temperature at which each of such stages is effected, depends primarily upon the composition of the well effluent and the properties desired in the liquid hydrocarbon fractions produced by the process. When, as is usually the case, it is desired to obtain the liquefiable components of the well effluent in the form of two liquid fractions of more or less equal volume, exclusive of any liquid which may be separated prior to the first expansion step, the gas may be expanded to approximately the mid-point of the retrograde condensation range in a first expansion step and to the lower limit of the retrograde condensation range in a second expansion step. Thus, for example, a well effluent taken from the well head at a pressure of 3000 p. s. i. may first be passed to an initial separator to separate any entrained liquid condensate, and may then be expanded in a first expansion step to a pressure of about 2000 p. s. i. After separation of the liquid which is thereby condensed and which comprises a first liquid hydrocarbon fraction, the gas is then cooled as herein explained and is further expanded to the lower limit of the retrograde condensation range, e. g., to about 1000 p. s. i., and a second quantity of condensate is separated as a second liquid hydrocarbon fraction. The composition and relative volume of each of the liquid hydrocarbon fractions may be varied by varying the pressure to which the gas is expanded in the first expansion step. Operation of the process to produce three or more liquid hydrocarbon fractions of varying composition and volume may be effected in a similar manner by providing a corresponding number of expansion-separation stages carried out under predetermined conditions of pressure and temperature. The principle of the invention lies in the concept of expanding a well effluent through the retrograde condensation range in two or more steps, each of which is followed by a gas-liquid separation step as herein explained rather than in the specific conditions under which such steps are effected.

Other modes of applying the principle of our invention may be employed instead of those explained, change being made as regards the methods or materials employed, provided the step or steps stated by any of the following claims, or the equivalent of such stated step or steps, be employed.

We, therefore, particularly point out and distinctly claim as our invention:

1. The process of separating liquefiable hydrocarbons from natural gas produced at a high pressure substantially above the lower limit of the retrograde condensation range which comprises reducing the pressure of said gas to approximately the lower limit of the retrograde condensation range by expanding the gas to successively lower pressures in at least two expansion steps, separating condensed liquid from the gas after each of said expansion steps, and refrigerating the gas prior to at least the final expansion step by passing it in heat exchange relationship to at least part of the gas withdrawn from the succeeding separation step.

2. The process of separating liquefiable hydrocarbons from natural gas produced at a high pressure substantially above the lower limit of the retrograde condensation range which comprises separating entrained liquids from the gas at approximately the well head pressure, reducing the pressure of said gas to approximately the lower limit of the retrograde condensation range by expanding the gas to successively lower pressures in at least two expansion steps, separating condensed liquid from the gas after each of said expansion steps, and refrigerating the gas prior to at least the final expansion step by passing the gas in indirect heat exchange relationship to at least part of the gas withdrawn from the succeeding separation step.

3. The process of separating liquefiable hydrocarbons from natural gas produced at a high pressure substantially above the lower limit of the retrograde condensation range which comprises reducing the pressure of said gas to approximately the lower limit of the retrograde condensation range by expanding the gas to successively lower pressures in at least two expansion steps carried out in the presence of a hydrocarbon hydrate inhibitor, separating aqueous hydrate inhibitor and condensed hydrocarbons from the gas after each of said expansion steps, and refrigerating the gas prior to at least the final expansion step by passing it in indirect heat exchange relationship to at least part of the gas withdrawn from the succeeding separation step.

4. The process of separating liquefiable hydrocarbons from natural gas produced at a high pressure substantially above the lower limit of the retrograde condensation range which comprises separating entrained liquids from the gas at approximately the well head pressure, reducing the pressure of said gas to approximately the lower limit of the retrograde condensation range by expanding the gas to successively lower pressures in at least two expansion steps carried out in the presence of a hydrocarbon hydrate inhibitor, separating aqueous hydrate inhibitor and condensed hydrocarbons from the gas after each of said expansion steps, and refrigerating the gas prior to the final expansion step by passing it in indirect heat exchange relationship to at least part of the gas withdrawn from the final separation step.

5. The process of separating liquefiable hydrocarbons from natural gas produced at a high pressure substantially above the lower limit of the retrograde condensation range which comprises expanding the gas to a lower pressure within the retrograde condensation range, separating condensed liquid from the partially expanded gas, refrigerating the partially expanded gas, further expanding the refrigerated gas to approximately the lower limit of the retrograde condensation range, separating condensed liquid from the expanded gas, and passing at least part of said expanded gas in indirect heat exchange relationship to the partially expanded gas whereby at least part of the refrigeration of the partially expanded gas is effected.

6. The process of separating liquefiable hydrocarbons from natural gas produced at a high pressure substantially above the lower limit of the retrograde condensation range which comprises separating entrained liquids from the gas at approximately the well head pressure, expanding the gas to a lower pressure within the retrograde condensation range, separating condensed liquid from the partially expanded gas, refrigerating the partially expanded gas, further expanding the refrigerated gas to approximately the lower limit of the retrograde condensation range, separating condensed liquid from the expanded gas, and passing at least part of said expanded gas in indirect heat exchange relationship to the partially expanded gas whereby at least part of the refrigeration of the partially expanded gas is effected.

7. The process of separating liquefiable hydrocarbons from natural gas produced at a high pressure substantially above the lower limit of the retrograde condensation range which comprises introducing a hydrocarbon hydrate inhibitor into the gas, expanding the gas to a lower pressure within the retrograde condensation range, separating aqueous hydrate inhibitor and condensed hydrocarbons from the partially expanded gas, introducing a hydrocarbon hydrate inhibitor into the partially expanded gas, refrigerating the partially expanded gas, further expanding the refrigerated gas to approximately the lower limit of the retrograde condensation range, separating aqueous hydrate inhibitor and condensed hydrocarbons from the expanded gas and passing at least part of said expanded gas in indirect heat exchange relationship to the partially expanded gas whereby at least part of the refrigeration of the partially expanded gas is effected.

8. The process of separating liquefiable hydrocarbons from natural gas produced at a high pressure substantially above the lower limit of the retrograde condensation range which comprises separating entrained liquids from the gas at approximately the well head pressure, introducing a hydrocarbon hydrate inhibitor into the gas, expanding the gas to a lower pressure within the retrograde condensation range, separating aqueous hydrate inhibitor and condensed hydrocarbons from the partially expanded gas, introducing a hydrocarbon hydrate inhibitor into the partially expanded gas, refrigerating the partially expanded gas, further expanding the refrigerated gas to approximately the lower limit of the retrograde condensation range, separating aqueous hydrate inhibitor and condensed hydrocarbons from the expanded gas, and passing at least part of said expanded gas in indirect heat exchange relationship to the partially expanded gas whereby at least part of the refrigeration of the partially expanded gas is effected.

9. The process of separating liquefiable hydrocarbons from natural gas produced at a high pressure substantially above the lower limit of the retrograde condensation range which comprises separating entrained liquids from the gas at approximately the well head pressure, introducing a hydrocarbon hydrate inhibitor into the gas, expanding the gas to a lower pressure within the retrograde condensation range, separating aqueous hydrate inhibitor and condensed hydrocarbons from the partially expanded gas, introducing a hydrocarbon hydrate inhibitor into the partially expanded gas, refrigerating the partially expanded gas, further expanding the refrigerated gas to approximately the lower limit of the retrograde condensation range, separating aqueous hydrate inhibitor and condensed hydrocarbons from the expanded gas, further expanding the gas to a pressure suitable for pipeline transportation of the same, and passing at least part of the gas at said pipeline transportation pressure in indirect heat exchange relationship to the partially expanded gas whereby at least part of the refrigeration of the partially expanded gas is effected.

10. The process of separating liquefiable hydrocarbons from natural gas produced at a high pressure near the upper limit of the retrograde condensation range which comprises separating entrained liquids from the gas at approximately the well head pressure, expanding the gas to approximately the mid-point of the retrograde condensation range, separating condensed liquids from the partially expanded gas, refrigerating the partially expanded gas, further expanding the refrigerated gas to approximately the lower limit of the retrograde condensation range, separating condensed liquids from the expanded gas, and passing at least part of said expanded gas in indirect heat exchange relationship to the partially expanded gas whereby at least part of the refrigeration of the partially expanded gas is effected.

11. The process of separating liquefiable hydrocarbons from natural gas produced at a high pressure near the upper limit of the retrograde condensation range which comprises separating entrained liquids from the gas at approximately the well head pressure, introducing a hydrocarbon hydrate inhibitor into the gas, expanding the gas to approximately the mid-point of the retrograde condensation range, separating aqueous hydrate inhibitor and condensed hydrocarbons from the partially expanded gas, introducing a hydrocarbon hydrate inhibitor into the partially expanded gas, refrigerating the partially expanded gas, further expanding the refrigerated gas to approximately the lower limit of the retrograde condensation range, separating aqueous hydrate inhibitor and condensed hydrocarbons from the expanded gas, and passing at least part of said expanded gas in indirect heat exchange relationship to the partially expanded gas whereby at least part of the refrigeration of the partially expanded gas is effected.

CLARE D. GARD.
LAWTON L. LAURENCE.

REFERENCES CITED

The following references are of record in the file of this patent:

UNITED STATES PATENTS

| Number | Name | Date |
| --- | --- | --- |
| Re. 21,239 | Walker | Oct. 17, 1939 |
| Re. 22,226 | Buckley | Dec. 1, 1942 |
| 2,217,749 | Hewitt | Oct. 15, 1940 |
| 2,297,062 | McKee | Sept. 29, 1942 |